Dec. 30, 1969  L. W. HAMLIN  3,487,199
PORTABLE ELECTRIC COOKER
Filed Jan. 10, 1968

INVENTOR
LEWIS W. HAMLIN

BY *Raphael Semmes*

ATTORNEY

# United States Patent Office 3,487,199
Patented Dec. 30, 1969

3,487,199
PORTABLE ELECTRIC COOKER
Lewis W. Hamlin, Jacksonville, Ark., assignor to Hamlin Products, Inc., Little Rock, Ark., a corporation of Arkansas
Filed Jan. 10, 1968, Ser. No. 696,803
Int. Cl. A21b 1/00; F23q 7/00
U.S. Cl. 219—399    4 Claims

ABSTRACT OF THE DISCLOSURE

A portable electric cooker having a casing provided with a layer of perlite or other suitable heat insulation extending across the bottom of the casing and surmounted by an aluminum foil pan. A grate lies on top of the pan and supports an electric heating element, and a layer of a permanent, rock-like, ceramic material having heat impounding characteristics covers the heating element. A cooking grid for supporting the food to be cooked extends across the layer of ceramic material in vertically spaced relation to the last-named layer. The purpose of the aluminum pan is (1) to reflect heat upwardly in the casing, and (2) to catch the drippings.

BACKGROUND OF THE INVENTION

Figure 1:
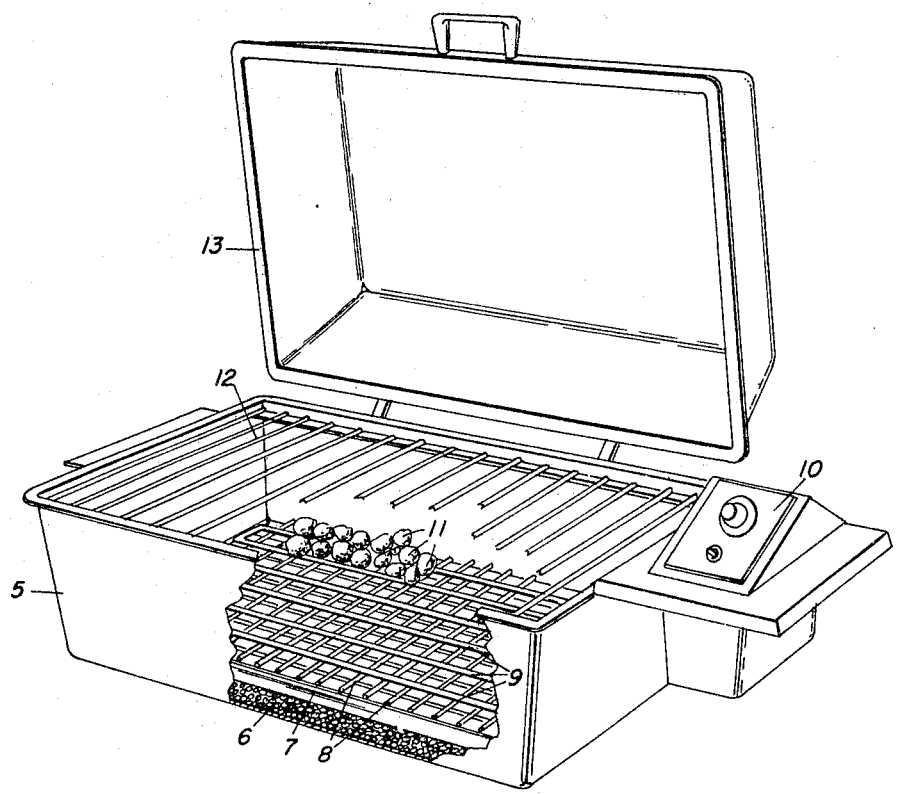

Various constructions have been developed in the past for portable electric cookers, such for example as those described in U.S. Patent Nos. 1,007,125 and 1,014,161, issued to Madsen and No. 2,874,631, issued to Cooksley. However, the voltage and wattage input required by these devices have been excessive, and their performance has left much to be desired.

The present invention represents a marked improvement, both in performance and voltage and wattage input requirements, by employing an aluminum foil pan in the bottom of the cooker casing, supported on top of a layer of insulating material and placing on top of the foil pan, a suitable grate. On the grate is an electric heating element which supports a layer of "Charrock," which is a permanent rock-like, ceramic material having the properties of holding the heat issuing from the heating element.

An object of the present invention is to provide a grouping of the heating element and heat reflecting and impounding elements in the lower portion of the cooker casing, in spaced relation to the grid on which the food is cooked, which will facilitate the circulation of heated air within the casing and reduce the electrical input requirements of the unit.

With the above and other objects in view which will appear as the description proceeds, the invention consists in the novel features herein set forth, illustrated in the accompanying drawings, and more particularly pointed out in the appended claims.

THE DRAWINGS

Figure 2:
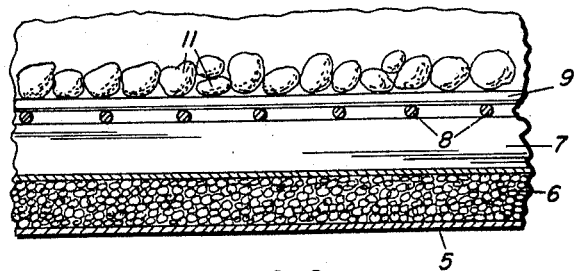

Referring to the drawings in which numerals of like character designate similar parts in both views:

FIG. 1 is a perspective view, partially broken away, illustrating the invention; and FIG. 2 is a fragmentary, sectional view, illustrating the relationship of the heating and heat reflecting components of the invention.

SPECIFICATION

In the drawings, 5 represents the lower section of the cooker, which is a relatively deep, rectangular casing, preferably cast of 3/16 inch rust-proof aluminum, the bottom of which is covered by a layer of perlite or other suitable insulating material. It has been found that a layer of perlite approximately two inches deep is adequate for this purpose. On top of the insulating layer 6 is placed an aluminum foil pan 7 which, as will later appear, reflects the heat upwardly in section 5, away from its bottom.

The upper edge of the pan 7 preferably supports a grate 8, composed of a series of crossed wires and extending entirely across the pan. A convolute electrical heating element 9, under the control of a switch unit 10, rests upon the top of the grate, its convolutions being co-extensive with the grate and supporting a layer of "Charrock" 11, or other permanent, rock-like ceramic material which retains the heat generated by the heating element 9.

The upper rim of the lower cooker section 5 supports a cooking grid 12 which is spaced above the "Charrock" layer a sufficient distance to provide an efficient heating area entirely across the section 5 below the food being cooked on the grid. Any suitable cover 13 may be hingedly or otherwise connected to the section 5, as shown. It may be noted that the grid 12 may be hinged to the section 5, or may simply rest across the upper rim thereof so as to be easily removed for purposes of cleaning.

It may be noted that the switch unit 10 of the present invention forms the subject matter of a separate application, Ser. No. 691,490, filed Dec. 18, 1967, now Patent No. 3,395,260, and by virtue of such a switch, the present invention is highly adaptable for use as an outdoor cooker which may either be left out of doors at all times or stored away when not in use.

By grouping the heating element, the heat reflecting element, and heat impounding layer in close proximity to the bottom of the lower section and insulating the latter, the present invention effects a major breakthrough in minimizing voltage and wattage input requirements. The heat from the heating element is reflected from the bottom of the casing so that the only heat which can reach the bottom is from conductivity instead of reflection and radiation. It has been found that the skin temperature of the bottom of the casing is reduced by approximately 100° F. from that of a cooker not provided with the reflector and "Charrock" layer and the insulated bottom. In actual tests, the present invention is able to produce the same performance with a 120 volt, 2000 watt element as could be produced with a 240 volt, 4400 watt mechanism.

In use, the operator simply turns on the switch unit which is suitably connected to a source of electric current and energizes the heating element 9. The heat from the element 9 is reflected upwardly in the cooker section 5, and the radiated heat circulates through and is impounded in the layer of "Charrock" on the heating element, and when sufficient heat has been developed, the food to be cooked is placed upon the grid 12 with the cover 13 either open or closed, as desired. By reflecting the heat upwardly, the aluminum foil pan 7 serves to protect the bottom of section 5, and, at the same time, collects drippings from the cooking grid 12, thus enabling the use of relatively thin-gauge material for the cooker.

The device is easily assembled and disassembled for purposes of cleaning, as the various elements thereof are removably mounted.

From the foregoing, it is believed that the invention may be readily understood by those skilled in the art without further description, it being borne in mind that numerous changes may be made in the details disclosed without departing from the spirit of the invention as set forth in the following claims.

I claim:
1. A portable electric cooker comprising a relatively deep metal casing, a layer of heat insulating material covering the inner surface of the bottom of said casing, a pan of heat reflecting metal extending across and supported by said layer of insulating material, a convolute electric heating element spaced above and immediately overlying said pan and connected to a source of electric energy, a layer of lumps of heat impounding material arranged on top of said heating element and supported thereby, and a cooking grid extending over said last-named layer in vertically spaced relation to provide a heating area extending entirely across said casing below said cooking grid.

2. A cooker as claimed in claim 1, wherein said pan is formed of aluminum foil.

3. A cooker as claimed in claim 1, wherein said casing is provided with a removable cover.

4. A cooker as claimed in claim 1, wherein said last-named layer comprises lumps of a ceramic material.

References Cited

UNITED STATES PATENTS

| | | | |
|---|---|---|---|
| 2,790,434 | 4/1957 | Del Francia | 126—41 |
| 2,866,883 | 12/1958 | Borden | 209—260 X |
| 2,903,549 | 9/1959 | Joseph | 219—400 |
| 3,905,077 | 9/1959 | Del Francia | 99—446 |
| 3,098,427 | 7/1963 | Del Francia | 99—446 |
| 3,155,814 | 11/1964 | Appleman et al. | 219—354 |
| 3,286,620 | 11/1966 | Brown | 99—446 |
| 3,368,061 | 2/1968 | Lahti | 219—378 X |

VOLODYMYR Y. MAYEWSKY, Primary Examiner

U.S. Cl. X.R.

99—446; 126—25; 219—260, 347, 405